United States Patent
Ono et al.

(10) Patent No.: US 12,533,039 B2
(45) Date of Patent: Jan. 27, 2026

(54) FLOW PATH PLATE UNIT AND BLOOD PRESSURE MEASUREMENT DEVICE

(71) Applicant: OMRON HEALTHCARE CO., LTD., Muko (JP)

(72) Inventors: Takashi Ono, Kyoto (JP); Yoshihide Tokko, Kyoto (JP); Masaki Harada, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 417 days.

(21) Appl. No.: 18/356,668

(22) Filed: Jul. 21, 2023

(65) Prior Publication Data

US 2023/0355114 A1    Nov. 9, 2023

Related U.S. Application Data

(63) Continuation of application No. PCT/JP2022/002600, filed on Jan. 25, 2022.

(30) Foreign Application Priority Data

Jan. 29, 2021    (JP) ................ 2021-012847

(51) Int. Cl.
*A61B 5/022*    (2006.01)
*A61B 5/00*    (2006.01)
*A61B 5/021*    (2006.01)

(52) U.S. Cl.
CPC .......... *A61B 5/02233* (2013.01); *A61B 5/681* (2013.01); *A61B 2562/0247* (2013.01)

(58) Field of Classification Search
CPC ................ A61B 5/02233; A61B 5/681; A61B 2562/0247; A61B 5/02141; A61B 5/022
See application file for complete search history.

(56) References Cited

U.S. PATENT DOCUMENTS

| 11,266,349 B2 | 3/2022 | Mizuno et al. | |
| 2019/0313924 A1* | 10/2019 | Matsumura | A61B 5/02116 |
| 2019/0328324 A1* | 10/2019 | Mizuno | A61B 5/02141 |
| 2020/0205679 A1 | 7/2020 | Fujita et al. | |

FOREIGN PATENT DOCUMENTS

| JP | 2003-114229 A | 4/2003 |
| JP | 2006-081406 A | 3/2006 |
| JP | 2008-194568 A | 8/2008 |
| JP | 2017-193014 A | 10/2017 |
| JP | 2018-143557 A | 9/2018 |
| JP | 2019-051010 A | 4/2019 |

OTHER PUBLICATIONS

Mar. 22, 2022 International Search Report issued in International Patent Application No. PCT/JP2022/002600.

* cited by examiner

*Primary Examiner* — Justin Xu
(74) *Attorney, Agent, or Firm* — Oliff PLC

(57) ABSTRACT

A flow path plate unit includes a first flow path plate with at least one surface being formed in a planar shape; a second flow path plate with one surface, which is opposed to the surface of the planar shape of the first flow path plate, being formed in a planar shape; and an attachment member including a notch formed in a shape of a flow path, and being configured to attach the first flow path plate and the second flow path plate.

7 Claims, 11 Drawing Sheets

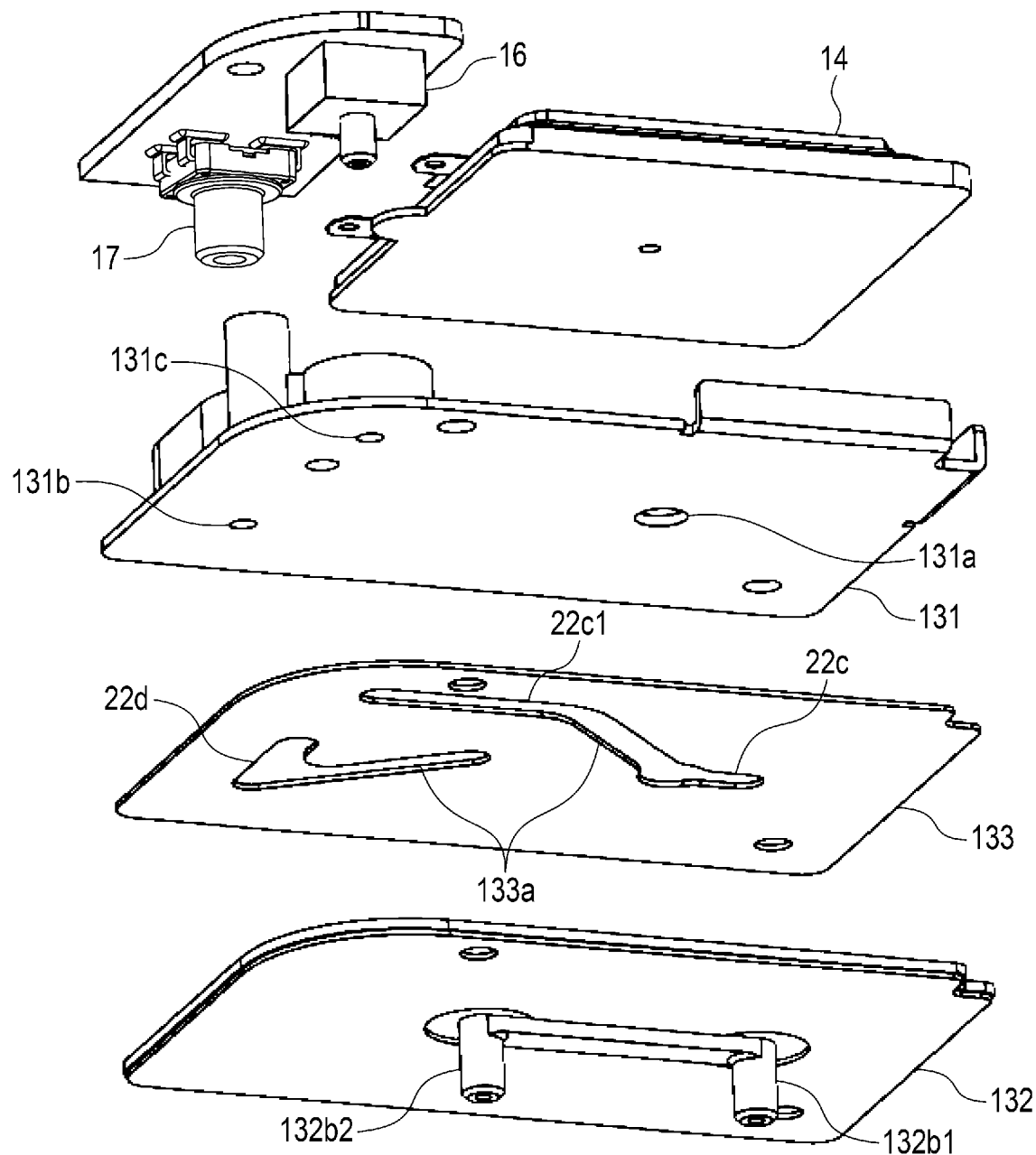
F I G. 3

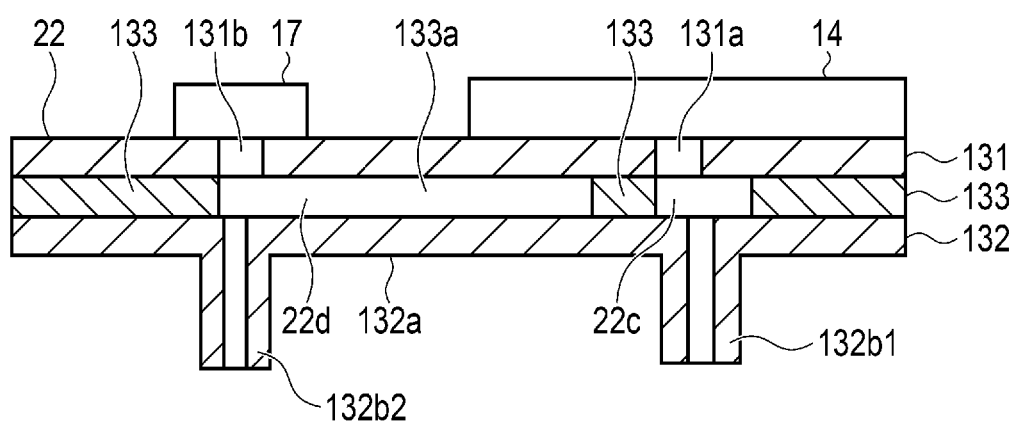
F I G. 4

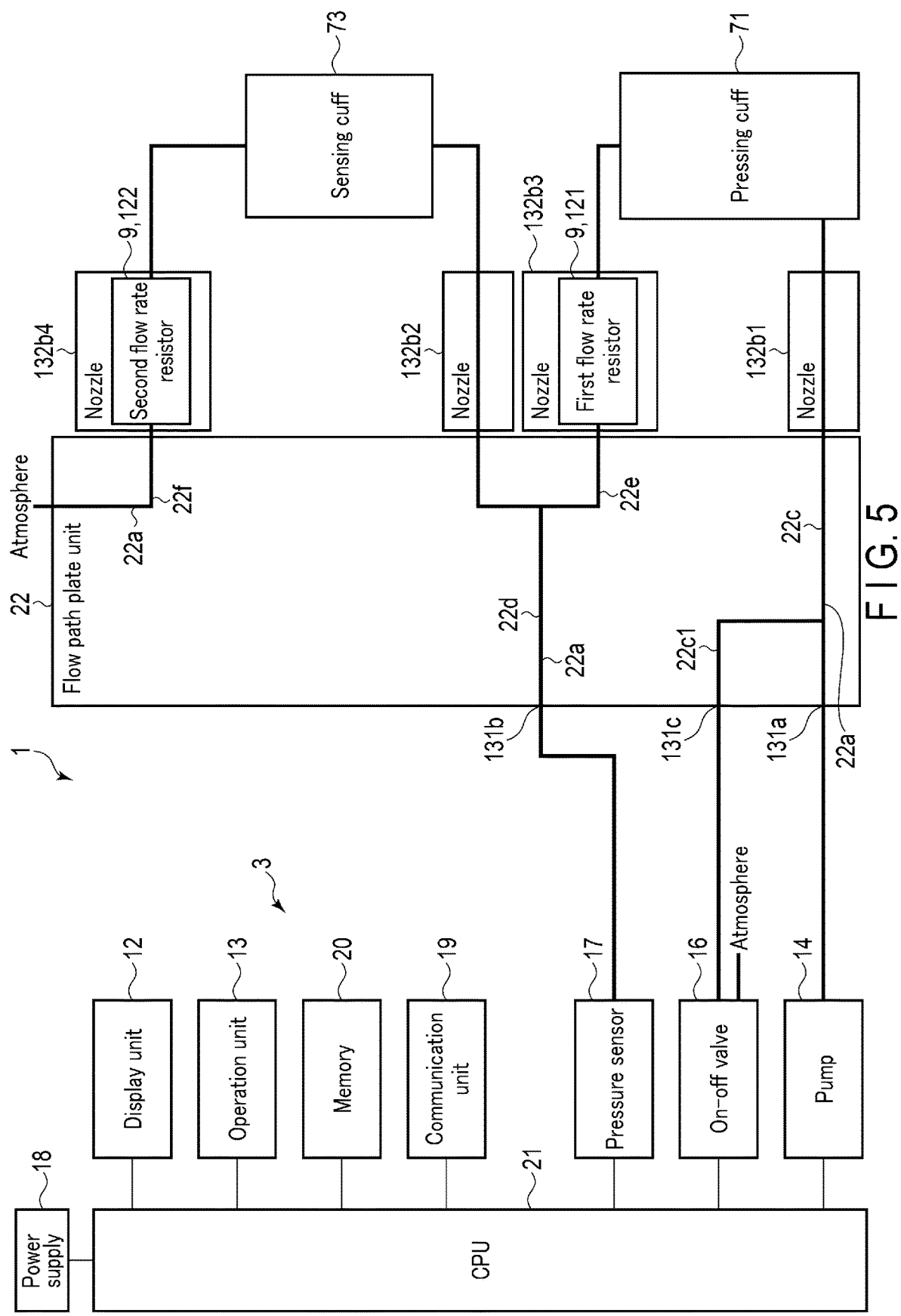
F I G. 5

FLOW PATH PLATE UNIT AND BLOOD PRESSURE MEASUREMENT DEVICE

CROSS-REFERENCE TO RELATED APPLICATION

This application is a Continuation Application of PCT Application No. PCT/JP2022/002600, filed Jan. 25, 2022 and based upon and claiming the benefit of priority from Japanese Patent Application No. 2021-012847, filed Jan. 29, 2021, the entire contents of all of which are incorporated herein by reference.

FIELD

The present invention relates to a flow path plate unit and a blood pressure measurement device.

BACKGROUND

In recent years, blood pressure measurement devices used for measuring blood pressure are being used as means to check health status at home, as well as in medical facilities. A blood pressure measurement device detects vibration of the artery wall to measure blood pressure by, for example, inflating and contracting a cuff wrapped around the upper arm or the wrist of a living body and detecting the pressure of the cuff by a pressure sensor.

As such a blood pressure measurement device, there is known a technique in which a spacer plate is disposed between a base plate, on one surface side of which a pump or the like is disposed, and a plate-like member disposed to face the other surface of the base plate, and a flow path extending from the pump to a cuff is constituted by a pattern formed in the spacer plate (Jpn. Pat. Appln. KOKAI Publication No. 2018-143557).

PATENT LITERATURE

Patent document 1: Jpn. Pat. Appln. KOKAI Publication No. 2018-143557

SUMMARY

Recently, there is a demand for reduction in size of a blood pressure measurement device as a wearable device worn on the wrist. However, in patent document 1, the spacer plate is described as being formed of a synthetic resin such as polyurethane, and the dimension in the thickness direction of the spacer increases in order to keep the strength for forming the flow path pattern in the spacer plate. In addition, in order to surely seal the flow path, it is necessary to attach the spacer plate, and the base plate and plate-like member, and the dimension in the thickness direction increases by a degree corresponding to this attachment layer.

In this manner, there is concern that the increase in the thickness direction of an integral body of the base plate, plate-like member and spacer plate leads to an increase in size of a case that accommodates these elements.

Thus, the object of the present invention is to provide a flow path plate unit and a blood pressure measurement device capable of being reduced in size.

According to one aspect, there is provided a flow path plate unit including a first flow path plate with at least one surface being formed in a planar shape; a second flow path plate with one surface, which is opposed to the surface of the planar shape of the first flow path plate, being formed in a planar shape; and an attachment member including a notch formed in a shape of a flow path, and being configured to attach the first flow path plate and the second flow path plate.

According to this aspect, in the flow path plate unit, the first flow path plate and the second flow path plate are integrally formed by the attachment member, and the flow path is formed by the notch of the attachment member. Thus, there is no need to form a recess for forming the flow path in the first flow path plate or the second flow path plate, and the dimension in the thickness direction of the flow path plate unit can be reduced. As a result, the flow path plate unit can be reduced in size.

There is provided the flow path plate unit of the above aspect, wherein the attachment member is a double-sided tape.

According to this aspect, since the attachment member is the double-sided tape, the notch can easily be formed, the first flow path plate and second flow path plate can easily be attached, and the management of the thickness is easy. Thus, by using the attachment member that is the double-sided tape, the flow path plate unit is capable of easily forming the flow path.

There is provided the flow path plate unit of the above aspect, wherein at least one of the first flow path plate and the second flow path plate is formed of a metallic material.

According to this aspect, at least one of the first flow path plate and the second flow path plate can be formed of, for example, a metallic plate, and the dimension in the thickness direction of the flow path plate unit can be reduced.

There is provided the flow path plate unit of the above aspect, which further includes a plurality of nozzles provided on the second flow path plate and connected to a cuff; and a fluid control unit provided in at least one of the nozzles.

Here, the cuff includes a bag-like structure that is wrapped around the upper arm or the wrist of a living body at a time of measuring blood pressure, and inflates by being supplied with a fluid. The fluid includes a liquid and air. When the fluid is air, the bag-like structure is, for example, an air bag that inflates by air. The fluid control unit is, for example, a flow rate resistor such as an orifice, or a check valve.

According to this aspect, by providing the fluid control unit in the nozzle connected to the cuff, an installation space for the fluid control unit is not needed separately, and the flow path plate unit can be reduced in size.

There is provided the flow path plate unit of the above aspect, wherein the attachment member includes a third flow path plate including a flow path, a first attachment member configured to attach the one major surface of the first flow path plate and one major surface of the third flow path plate, and a second attachment member configured to attach the one major surface of the second flow path plate and the other major surface of the third flow path plate.

According to this aspect, since the third flow path plate including the flow path is provided, the degree of freedom of the flow path of the flow path plate unit can be enhanced, and since the third flow path plate is not configured to include a recess, the flow path plate unit can be reduced in size. Moreover, since a portion of the flow path of the flow path plate unit is formed in the third flow path plate, the accuracy in shape of the flow path can be enhanced.

There is provided the flow path plate unit of the above aspect, wherein the flow path of the third flow path plate includes a fluid control unit through which a fluid flows in a thickness direction of the third flow path plate.

According to this aspect, the flow path plate unit, in the inside of which the fluid control unit can be provided, can be obtained. Moreover, by forming the fluid control unit in the flow path of the third flow path plate, the fluid control unit is formed by a portion of the third flow path plate. Thus, the accuracy in shape of the fluid control unit can be enhanced.

There is provided the flow path plate unit of the above aspect, wherein the flow path of the third flow path plate includes a fluid control unit through which a fluid flows in a plane direction of the third flow path plate.

According to this aspect, the flow path plate unit, in the inside of which the fluid control unit can be provided, can be obtained. Moreover, by forming the fluid control unit in the flow path of the third flow path plate, the fluid control unit is formed by a portion of the third flow path plate. Thus, the accuracy in shape of the fluid control unit can be enhanced.

According to one aspect, there is provided a blood pressure measurement device including a flow path plate unit including a first flow path plate with at least one surface being formed in a planar shape, a second flow path plate with one surface, which is opposed to the surface of the planar shape of the first flow path plate, being formed in a planar shape, and an attachment member including a notch formed in a shape of a flow path, and being configured to attach the first flow path plate and the second flow path plate; a pump connected to the flow path plate unit; a pressure sensor connected to the flow path plate unit; and a cuff connected to the flow path plate unit and fluidly connected to the pump and the pressure sensor via the flow path plate unit.

According to this aspect, in the flow path plate unit, the first flow path plate and the second flow path plate are integrally formed by the attachment member, and the flow path is formed by the notch of the attachment member. Thus, there is no need to form a recess for forming the flow path in the first flow path plate or the second flow path plate, and the dimension in the thickness direction of the flow path plate unit can be reduced. As a result, the flow path plate unit can be reduced in size.

There is provided the blood pressure measurement device of the above aspect, wherein the attachment member is a double-sided tape.

According to this aspect, since the attachment member is the double-sided tape, the notch can easily be formed, the first flow path plate and second flow path plate can easily be attached, and the management of the thickness is easy. Thus, by using the attachment member that is the double-sided tape, the flow path plate unit is capable of easily forming the flow path.

There is provided the blood pressure measurement device of the above aspect, which further includes a plurality of nozzles provided on the second flow path plate and connected to the cuff; and a fluid control unit provided in at least one of the nozzles.

According to this aspect, by providing the fluid control unit in the nozzle connected to the cuff, an installation space for the fluid control unit is not needed separately, and the flow path plate unit can be reduced in size. As a result, the blood pressure measurement device can be reduced in size.

There is provided the blood pressure measurement device of the above aspect, wherein the attachment member includes a third flow path plate including a flow path, a first attachment member configured to attach the one major surface of the first flow path plate and one major surface of the third flow path plate, and a second attachment member configured to attach the one major surface of the second flow path plate and the other major surface of the third flow path plate.

According to this aspect, since the third flow path plate including the flow path is provided, the degree of freedom of the flow path of the flow path plate unit can be enhanced, and since the third flow path plate is not configured to include a recess, the flow path plate unit can be reduced in size. Moreover, since a portion of the flow path of the flow path plate unit is formed in the third flow path plate, the accuracy in shape of the flow path can be enhanced.

There is provided the blood pressure measurement device of the above aspect, wherein the flow path of the third flow path plate includes a fluid control unit through which a fluid flows in a thickness direction of the third flow path plate.

According to this aspect, the flow path plate unit, in the inside of which the fluid control unit can be provided, can be obtained. Moreover, by forming the fluid control unit in the flow path of the third flow path plate, the fluid control unit is formed by a portion of the third flow path plate. Thus, the accuracy in shape of the fluid control unit can be enhanced.

There is provided the blood pressure measurement device of the above aspect, wherein the flow path of the third flow path plate includes a fluid control unit through which a fluid flows in a plane direction of the third flow path plate.

According to this aspect, the flow path plate unit, in the inside of which the fluid control unit can be provided, can be obtained. Moreover, by forming the fluid control unit in the flow path of the third flow path plate, the fluid control unit is formed by a portion of the third flow path plate. Thus, the accuracy in shape of the fluid control unit can be enhanced.

According to the present invention, there can be provided a flow path plate unit and a blood pressure measurement device capable of being reduced in size.

BRIEF DESCRIPTION OF THE DRAWINGS

FIG. 3 is an exploded perspective view illustrating a configuration of a pump, an on-off valve, a pressure sensor and a flow path plate unit of the blood pressure measurement device.

FIG. 4 is a cross-sectional view illustrating a configuration of the pump, pressure sensor and flow path plate unit of the blood pressure measurement device.

FIG. 5 is a block diagram illustrating a configuration of a first modification of the blood pressure measurement device.

DESCRIPTION OF EMBODIMENTS

First Embodiment

Hereinafter, one example of a blood pressure measurement device 1 according to a first embodiment of the present invention is described with reference to FIGS. 1 to FIG. 4.

Figure 1:
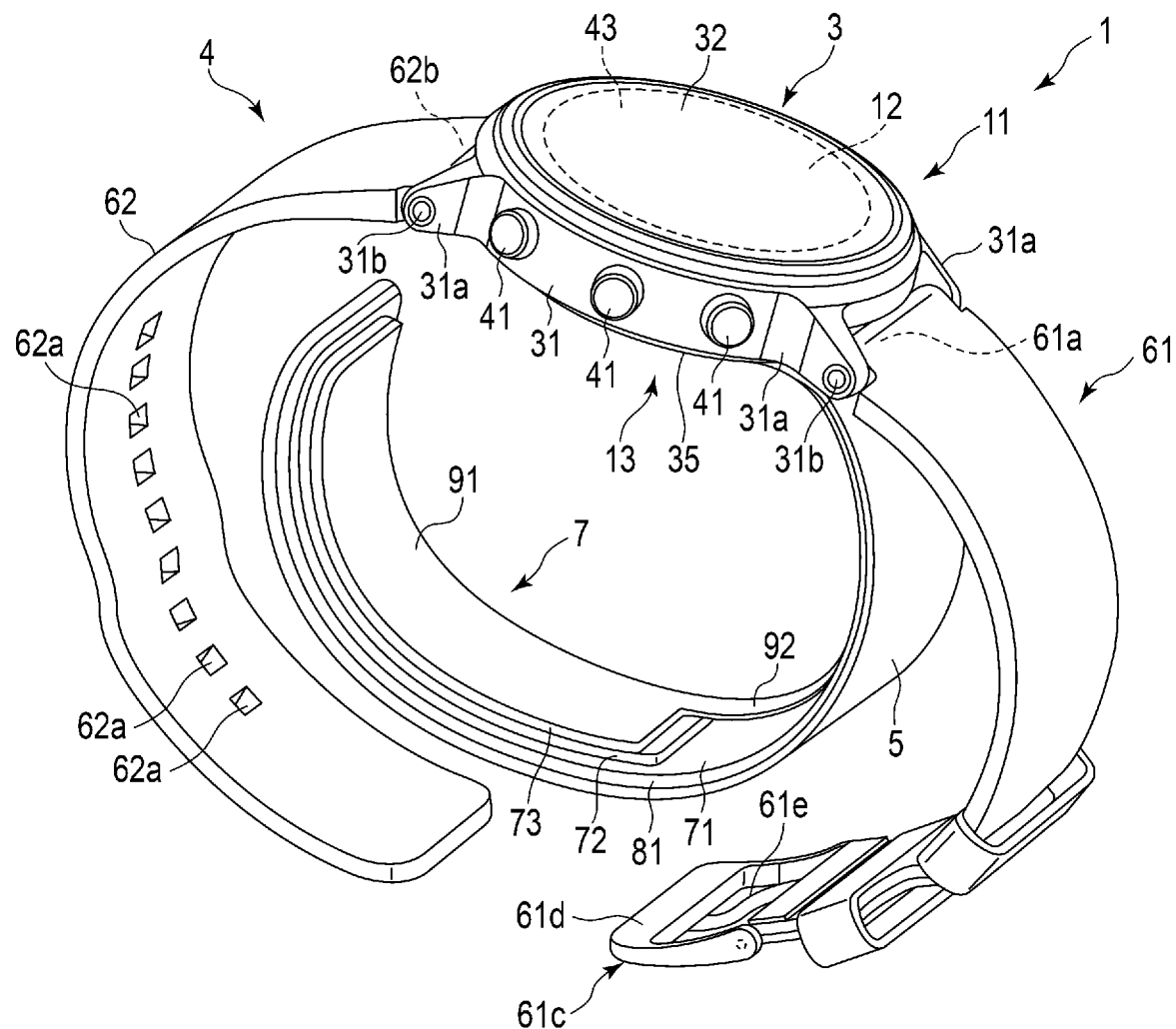
FIG. 1 is a perspective view illustrating a configuration of a blood pressure measurement device according to a first embodiment of the present invention.
Figure 2:
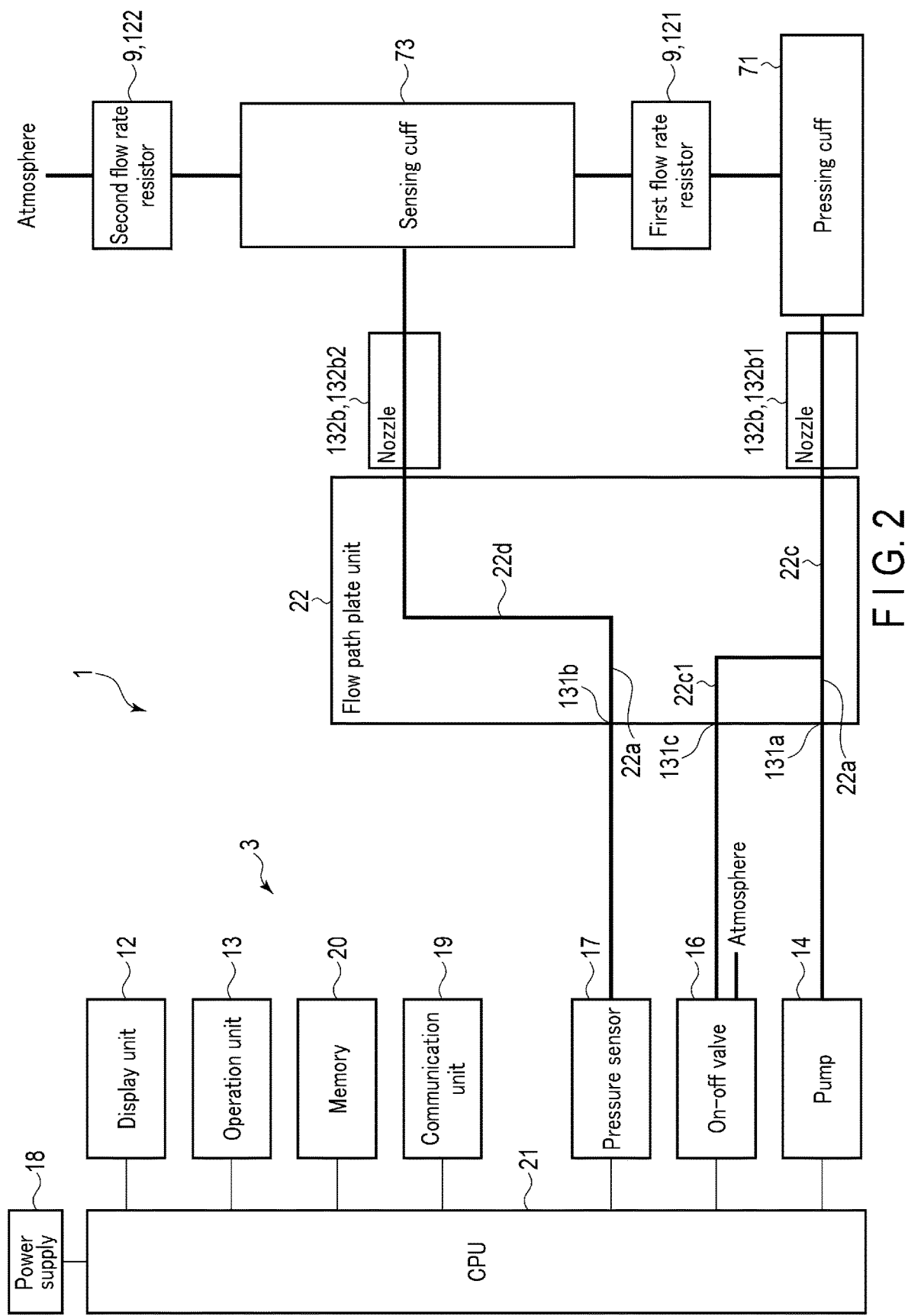
FIG. 2 is a block diagram illustrating a configuration of the blood pressure measurement device.

FIG. 1 is a perspective view illustrating a configuration of the blood pressure measurement device 1. FIG. 2 is a block diagram illustrating a configuration of the blood pressure measurement device 1. FIG. 3 is an exploded perspective view illustrating a configuration of a pump 14, an on-off valve 16, a pressure sensor 17 and a flow path plate unit 22 of the blood pressure measurement device 1. FIG. 4 is a cross-sectional view illustrating a configuration of the pump 14, pressure sensor 17 and flow path plate unit 22 of the blood pressure measurement device 1.

The blood pressure measurement device 1 is an electronic blood pressure measurement device that is worn on a living body. In the example of the present embodiment, the blood pressure measurement device 1 is in a mode of a wearable device that is worn on the wrist, and is an electronic blood pressure measurement device in a mode of measuring blood pressure from an artery.

As illustrated in FIG. 1 to FIG. 4, the blood pressure measurement device 1 includes, for example, a device body 3, a belt 4, a curler 5, a cuff structure 7, and a fluid control unit 9.

The device body 3 includes, for example, a case 11, a display unit 12, an operation unit 13, a pump 14, an on-off valve 16, a pressure sensor 17, a power supply 18, a communication unit 19, a memory 20, a CPU 21, and a flow path plate unit 22.

The case 11 accommodates, for example, the display unit 12, operation unit 13, pump 14, on-off valve 16, pressure sensor 17, power supply 18, communication unit 19, memory 20, CPU 21, and flow path plate unit 22.

The case 11 includes, for example, an exterior case 31, a windshield 32 covering an upper opening of the exterior case 31, and a back cover 35 covering a lower side of the exterior case 31.

The exterior case 31 is formed, for example, in a cylindrical shape. The exterior case 31 includes a pair of lugs 31*a* provided at each of symmetrical positions in a circumferential direction of an outer peripheral surface, and a spring bar 31*b* provided between each of two pairs of lugs 31*a*. The windshield 32 is a circular glass plate.

The display unit 12 is disposed immediately under the windshield 32. The display unit 12 is electrically connected to the CPU 21. The display unit 12 is, for example, a liquid crystal display or an organic electroluminescence display. The display unit 12 displays various types of information including a date and time, and measurement results of blood pressure values such as maximum blood pressure and minimum blood pressure, a heart rate, and the like.

The operation unit 13 is configured to be capable of inputting an instruction from a user. The operation unit 13 includes, for example, a plurality of buttons 41 provided on the case 11, a sensor that detects operations on the buttons 41, and a touch panel 43 provided on the display unit 12 or windshield 32. By being operated by the user, the operation unit 13 converts an instruction to an electric signal. The sensor and the touch panel 43 are electrically connected to the CPU 21, and outputs electric signals to the CPU 21.

The pump 14 is, for example, a piezoelectric pump. The pump 14, for example, compresses air, and supplies compressed air to the cuff structure 7 via the flow path plate unit 22. The pump 14 is electrically connected to the CPU 21.

The on-off valve 16 is a valve for safety, which releases air that is supplied to the pressing cuff 71 to the atmosphere. The on-off valve 16 is connected to, for example, a branch flow path 22*c*1 of a first flow path 22*c* (to be described later) of the flow path plate unit 22, which connects the pump 14 and on-off valve 16 to the pressing cuff 71. The on-off valve 16 is electrically connected to the CPU 21. For example, the on-off valve 16 is opened and closed by the control of the CPU 21.

The on-off valve 16 is, for example, a quick exhaust valve capable of performing quick exhaust, the opening degree of the on-off valve 16 or the opening area of the first flow path 22*c* being set such that a fluid resistance becomes as low as possible. When air is supplied to the pressing cuff 71 and sensing cuff 73 at a time of measuring blood pressure, the on-off valve 16 is switched to a closed state by being controlled by the CPU 21. In addition, when air is exhausted from the pressing cuff 71 and sensing cuff 73, the on-off valve 16 is switched from the closed state to an open state by being controlled by the CPU 21. Besides, the on-off valve 16 may be formed to be capable of adjusting the opening degree. Note that the on-off valve 16 may be integrally provided in the inside of the housing of the pump 14.

The pressure sensor 17 is fluidly connected to a flow path unit 22*a*. The pressure sensor 17 detects, for example, a pressure of the sensing cuff 73 of the cuff structure 7 via the flow path unit 22*a*. The pressure sensor 17 is electrically connected to the CPU 21, converts the detected pressure to an electric signal, and outputs the electric signal to the CPU 21.

The power supply 18 is, for example, a secondary battery such as a lithium-ion battery. The power supply 18 is electrically connected to the CPU 21. The power supply 18 supplies electric power to the CPU 21. The power supply 18 supplies driving power to the structural components of the CPU 21, and to the display unit 12, operation unit 13, pump 14, on-off valve 16, pressure sensor 17 and communication unit 19 via the CPU 21.

The communication unit 19 is configured to be capable of transmitting and receiving information to and from an external device wirelessly or by wire. The communication unit 19 transmits information, such as information controlled by the CPU 21 and measured blood pressure values and pulse, to an external device, and receives, for example, a program or the like for software update from an external device and transmits this to the control unit. In the present embodiment, the external device is, for example, an external terminal, such as a smartphone, a tablet terminal, a personal computer, and a smart watch.

In the present embodiment, the communication unit 19 and the external device may be directly connected, or may be connected over a network. The communication unit 19 and the external device may be connected via a mobile communication network, such as 4G and 5G, and a wireless communication line, such as Wimax and Wi-Fi (registered trademark). Further, the communication unit 19 and the external device may be connected by wireless communication means, such as Bluetooth (registered trademark), Near Field Communication (NFC), and infrared communication. Furthermore, the communication unit 19 and the external device may be connected over a wired communication line, such as a Universal Serial Bus (USB) and a Local Area Network (LAN) connection with a cable. Thus, the communication unit 19 may be configured to include a plurality of communication means, such as a wireless antenna and a micro-USB connector.

The memory 20 includes, for example, a Random Access Memory (RAM) and a Read Only Memory (ROM). The memory 20 stores various types of data. For example, the memory 20 pre-stores, for example, program data for controlling the overall blood pressure measurement device 1 and the pump 14, settings data for setting various functions of the blood pressure measurement device 1, and calculation data for calculating a blood pressure value and a pulse from the pressure measured by the pressure sensor 17, such that these data can be changed.

The CPU 21 controls the operation of the entire blood pressure measurement device 1 and the operations of the pump 14 and on-off valve 16, based on the programs stored in the memory 20 to perform a predetermined operation (function). In addition, in accordance with the read program, the CPU 21 performs, for example, a predetermined arithmetic operation, analysis, a process, and the like.

The flow path plate unit 22 is accommodated in the case 11. The flow path plate unit 22 fluidly connects the pump 14, on-off valve 16 and pressure sensor 17, and the cuffs 71 and 73 (to be described later) of the cuff structure 7. The flow path plate unit 22 includes a flow path unit 22a in the inside thereof. In addition, the flow path unit 22a fluidly connects the cuffs 71 and 73 and the atmosphere via the on-off valve 16.

The flow path plate unit 22 includes a first flow path plate 131, a second flow path plate 132, and an attachment member 133 that attaches the first flow path plate 131 and the second flow path plate 132. The flow path unit 22a is constituted by the first flow path plate 131, the second flow path plate 132 and attachment member 133.

The first flow path plate 131 has one surface formed in a planar shape, the one surface being opposed to the second flow path plate 132. On a surface of the first flow path plate 131, which is opposite to the surface thereof opposed to the second flow path plate 132, for example, the pump 14, on-off valve 16 and pressure sensor 17 are fixed. In the first flow path plate 131, for example, a hole that is fluidly connected to the pump 14, a hole that is fluidly connected to the on-off valve 16, and a hole that is fluidly connected to the pressure sensor 17, are formed. The first flow path plate 131 is formed of, for example, a metallic material. The first flow path plate 131 is, for example, a metallic plate. The thickness of the first flow path plate 131 is, for example, 0.4 mm.

The second flow path plate 132 has one surface formed in a planar shape, the one surface being opposed to the first flow path plate 131. The opposed surfaces of the second flow path plate 132 and first flow path plate 131 have substantially identical outer shapes. The second flow path plate 132 is formed of, for example, a metallic material. The thickness of the second flow path plate 132 is, for example, 0.4 mm.

The attachment member 133 attaches the first flow path plate 131 and the second flow path plate 132. The attachment member 133 includes a notch 133a that forms the flow path unit 22a together with the first flow path plate 131 and the second flow path plate 132 when the first flow path plate 131 and the second flow path plate 132 are attached. Specifically, the attachment member 133 is formed to have substantially the same shape as the outer shape of each of the opposed surfaces of the flow path plates 131 and 132, and is formed by providing the notch 133a that partly opens in a shape corresponding to the flow path unit 22a.

The attachment member 133 is, for example, a double-sided tape. A material with air-tightness is used for the attachment member 133. For example, the attachment member 133 is a double-sided tape including a base member formed of a material with air-tightness, such as an acrylic foam material. In addition, the thickness of the attachment member 133 is, for example, 0.2 mm.

The attachment member 133 is aligned with the first flow path plate 131 and the second flow path plate 132, for example, by using alignment holes provided in the first flow path plate 131 and second flow path plate 132. The attachment member 133 is fixed to the first flow path plate 131 and second flow path plate 132, for example, by manual work by a worker.

The details of the flow path unit 22a are described later.

As illustrated in FIG. 1, the belt 4 includes a first belt 61 provided on one pair of lugs 31a and one spring bar 31b, and a second belt 62 provided on the other pair of lugs 31a and the other spring bar 31b.

The first belt 61 is referred to as a so-called a parent and is configured like a band. The first belt 61 includes a buckle 61c provided at one end portion thereof. The first belt 61 is rotatably held on the exterior case 31. The buckle 61c includes a frame-shaped body 61d having a rectangular frame shape, and a buckle tongue 61e that is rotatably attached to the frame-shaped body 61d. The second belt 62 is referred to as a so-called tip of a blade, and is formed like a band having such a width as to be insertable into the frame-shaped body 61d. In addition, the second belt 62 includes a plurality of small holes 62a into which the buckle tongue 61e is insertable.

In the belt 4, the second belt 62 is inserted into the frame-shaped body 61d, and the buckle tongue 61e is inserted into the small hole 62a, and thereby the first belt 61 and second belt 62 are connected as one piece and form, together with the exterior case 31, an annular shape along the circumferential direction of the wrist.

The curler 5 is formed of a resin material and is configured in a band-like shape that curves in such a manner as to follow along the circumferential direction of the wrist. For example, one end of the curler 5 is fixed to the wrist side of the device body 3.

In addition, the curler 5 has a hardness appropriate to provide flexibility and shape retainability. Here, the flexibility refers to deformation of the shape of the curler 5 in a radial direction at the time of application of an external force of the belt 4 to the curler 5. The shape retainability refers to the ability of the curler 5 to maintain a pre-imparted shape when no external force is applied to the curler 5. The cuff structure 7 is disposed on the inner circumferential surface of the curler 5.

As illustrated in FIG. 1, the cuff structure 7 includes, for example, a pressing cuff 71, a back plate 72, and a sensing cuff 73. In the cuff structure 7, the pressing cuff 71, back plate 72 and sensing cuff 73 are stacked and formed as one piece. The cuff structure 7 is fixed to an inner surface of the curler 5.

In the example of the present embodiment, in the cuff structure 7, the pressing cuff 71 is connected to the sensing cuff 73 via the fluid control unit 9, and the sensing cuff 73 is connected to the atmosphere via the fluid control unit 9.

The pressing cuff 71 is connected to the flow path plate unit 22. The pressing cuff 71 is fluidly connected to the pump 14 via the flow path plate unit 22. One major surface of the pressing cuff 71 is fixed to the inner surface of the curler 5. For example, the pressing cuff 71 is attached to the inner surface of the curler 5 by a double-sided tape or an adhesive. By inflating, the pressing cuff 71 presses the back plate 72 and the sensing cuff 73 against the living body side.

The pressing cuff 71 includes, for example, an air bag 81.

The air bag 81 is a bag-like structure. In the present embodiment, since the blood pressure measurement device 1 is configured to use air by the pump 14, a description is given of a case of using the air bag. However, in a case of using a fluid other than air, the bag-like structure may be a fluid bag such as a liquid bag or the like.

The back plate 72 is adhered to a wrist-side surface of the pressing cuff 71 by a double-sided tape, an adhesive, or the like. The back plate 72 is formed of a resin material, and is formed in a plate shape. The back plate 72 is formed of, for example, polypropylene, and is formed in a plate shape with a thickness of about 1 mm. The back plate 72 has a shape follow-up characteristic.

Here, the shape follow-up characteristic means a function by which the back plate 72 is deformable in such a manner as to imitate the shape of a contacted part of the wrist to be placed. The contacted part of the wrist means an area of contact with the back plate 72, and the contact in this context means both a direct contact and an indirect contact.

The sensing cuff 73 is fixed to a wrist-side major surface of the back plate 72. The sensing cuff 73 comes indirect contact with an area where the artery of the wrist exists. The sensing cuff 73 is formed to have an identical shape to the back plate 72, or to have a smaller shape than the back plate 72, in the longitudinal direction and width direction of the back plate 72. By inflating, the sensing cuff 73 presses an area where a palm-side artery of the wrist exists. By the inflated pressing cuff 71, the sensing cuff 73 is pressed against the living body via the back plate 72.

In a concrete example, the sensing cuff 73 includes one air bag 91 and a flow path body 92.

Here, the air bag 91 is a bag-like structure. In the present embodiment, since the blood pressure measurement device 1 is configured to use air by the pump 14, a description is given of a case of using the air bag. However, in a case of using a fluid other than air, the bag-like structure may be a liquid bag or the like.

The air bag 91 is constituted in a rectangular shape that is long in one direction. The air bag 91 is formed by, for example, combining two sheet members long in one direction and thermally welding edge portions thereof.

The flow path body 92 is for example, integrally provided at a portion of one edge portion of the air bag 91 in the longitudinal direction. The flow path body 92 is provided at the end portion of the air bag 91 near the device body 3. Additionally, the flow path body 92 is formed in a shape that is long in one direction, with a width smaller than the dimension in the width direction of the air bag 91. The flow path body 92 includes, for example, a connection portion at a distal end thereof. The flow path body 92 is connected to the flow path unit 22a via the connection portion, and forms a flow path between the flow path unit 22a and the air bag 91.

The flow path body 92 is constituted, for example, by thermally welding, in a frame shape long in one direction, portions of the sheet members neighboring a region forming the air bag 91 of the sheet members, in a state in which the connection portion is disposed on the two sheet members. Note that, portions of the weld portions where the two sheet members are welded in a rectangular frame shape are not welded and the air bag 91 is formed continuous with a weld portion forming the flow path body 92, and thus the air bag 91 and the flow path body 92 fluidly communicate with each other.

The fluid control unit 9 controls, for example, the supply amount of air that is supplied to the cuffs 71 and 73. The fluid control unit 9 is, for example, a fluid resistor such as an orifice, or a check valve. In the example of the present embodiment, the fluid control unit 9 includes, for example, a plurality of flow rate resistors. In a concrete example, the fluid control unit 9 includes a first flow rate resistor 121 and a second flow rate resistor 122. The fluid control unit 9 controls the pressure ratio of air between the two cuffs 71 and 73 to become constant, by a flow rate resistance ratio between the first flow rate resistor 121 and the second flow rate resistor 122.

The fluid control unit 9 causes pressure differences between a primary-side pressure of the first flow rate resistor 121, a pressure between the first flow rate resistor 121 and second flow rate resistor 122, and a secondary-side pressure of the second flow rate resistor 122. By these pressure differences, the fluid control unit 9 controls the pressure ratio between the pressing cuff 71 of the primary side of the first flow rate resistor 121 and the sensing cuff 73 between the first flow rate resistor 121 and second flow rate resistor 122, such that the pressure ratio becomes constant.

The first flow rate resistor 121 connects the pressing cuff 71 to the sensing cuff 73. The first flow rate resistor 121 has, for example, a flow path cross-sectional area smaller than flow path cross-sectional areas on the primary side and the secondary side of the first flow rate resistor 121. The first flow rate resistor 121 is, for example, an orifice. The first flow rate resistor 121 narrows the flow path on the flow path from the pressing cuff 71 to the sensing cuff 73, thereby making lower the flow rate of air supplied to the secondary side of the first flow rate resistor 121 than the flow rate of air supplied to the pressing cuff 71.

The second flow rate resistor 122 connects the sensing cuff 73 to the atmosphere. The second flow rate resistor 122 has, for example, a flow path cross-sectional area smaller than a flow path cross-sectional area on the primary side of the second flow rate resistor 122. The second flow rate resistor 122 is, for example, an orifice.

The second flow rate resistor 122 narrows the flow path on the flow path from the flow path between the first flow rate resistor 121 and second flow rate resistor 122 to the atmosphere, thereby making lower the flow rate of air supplied to the secondary side (atmosphere) of the second flow rate resistor 122 than the flow rate of air supplied to the sensing cuff 73.

The flow rate resistance ratio between the first flow rate resistor 121 and second flow rate resistor 122 is adjusted in accordance with the characteristics of the cuffs 71 and 73 of the blood pressure measurement device 1.

Next, the flow path plate unit 22 is described. In regard to the flow path plate unit 22, a description is given of an example of such a configuration that the flow path plate unit 22 is connected to the cuff structure 7 configured such that the pressing cuff 71 and the sensing cuff 73 are connected via the first flow rate resistor 121, and the sensing cuff 73 is connected to the atmosphere via the second flow rate resistor 122.

The flow path unit 22a of the flow path plate unit 22 includes, for example, a first flow path 22c and a second flow path 22d.

The first flow path 22c fluidly connects the pump 14 and on-off valve 16 to the pressing cuff 71. In a concrete example, the first flow path 22c includes a branch flow path 22c1 that is branched on the secondary side of the pump 14. The branch flow path 22c1 is connected to the on-off valve 16.

The second flow path 22d is a flow path connected to the pressure sensor 17.

In a concrete example, a first hole 131*a*, a second hole 131*b* and a third hole 131*c* are formed in the first flow path plate 131. The holes 131*a*, 131*b* and 131*c* penetrate the first flow path plate 131.

The first hole 131*a* communicates with a discharge port of the pump 14. The first hole 131*a* constitutes a portion of the first flow path 22*c*. The first hole 131*a* is disposed, for example, on a central side of the first flow path plate 131. The second hole 131*b* is connected to the pressure sensor 17. The second hole 131*b* constitutes a portion of the second flow path 22*d*. The second hole 131*b* is disposed, for example, on an outer edge side of the first flow path plate 131. The third hole 131*c* is connected to the on-off valve 16. The third hole 131*c* constitutes a portion of the branch flow path 22*c*1. The third hole 131*c* is disposed, for example, on an outer edge side of the first flow path plate 131.

The second flow path plate 132 includes, for example, a flow path plate body 132*a* and a nozzle 132*b*.

The flow path plate body 132*a* has one surface formed in a planar shape, the one surface being opposed to the first flow path plate 131. The opposed surfaces of the flow path plate body 132*a* and the first flow path plate 131 have substantially identical outer shapes. The flow path plate body 132*a* is, for example, a metallic plate.

The nozzle 132*b* is provided on a surface of the flow path plate body 132*a* on the opposite side to the attachment member 133. The nozzle 132*b* is connected to the cuff structure 7. The nozzle 132*b* is formed of, for example, a resin. The nozzle 132*b* is formed as one piece with the flow path plate body 132*a*, for example, by insert molding.

In a concrete example, the nozzle 132*b* includes a first nozzle 132*b*1 and a second nozzle 132*b*2. The first nozzle 132*b*1 communicates with the first flow path 22*c*. The first nozzle 132*b*1 is connected to the pressing cuff 71. The second nozzle 132*b*2 communicates with the second flow path 22*d*. The second nozzle 132*b*2 is connected to the sensing cuff 73. The second nozzle 132*b*2 is connected to, for example, the flow path body 92.

According to the blood pressure measurement device 1 having the above-described configuration, in the flow path plate unit 22, by integrally attaching the first flow path plate 131 and second flow path plate 132 by the attachment member 133, the notch 133*a* formed in the attachment member 133 constitutes the flow path unit 22*a*.

In this manner, the thickness of the flow path plate unit 22 can be reduced by constituting the flow path by the notch 133*a* of the attachment member 133 that attaches the first flow path plate 131 and second flow path plate 132. Specifically, since the flow path unit 22*a* is formed by the notch 133*a* of the attachment member 133, there is no need to form a recess for forming the flow path unit 22*a* that extends in a direction along mutually opposed planar surfaces of the first flow path plate 131 and second flow path plate 132. Thus, for example, the first flow path plate 131 and the flow path plate body 132*a* of second flow path plate 132 can be formed of thin metallic plates, and the dimension in the thickness direction of the flow path plate unit 22 can be reduced, and therefore the blood pressure measurement device 1 can be reduced in size.

Furthermore, since the attachment member 133 is the double-sided tape, the notch 133*a* can easily be formed by a punching process. In addition, the flow path plate unit 22 including the flow path unit 22*a* can easily be constituted by simply attaching the attachment member 133, in which the notch 133*a* is formed, to the first flow path plate 131 and second flow path plate 132.

Moreover, since the attachment member 133 has a uniform thickness, the distance between the first flow path plate 131 and second flow path plate 132 can easily be managed, and therefore the flow path can easily be managed.

As has been described above, according to the present embodiment, the flow path plate unit 22 and the blood pressure measurement device 1 can be reduced in size by constituting the flow path by the notch 133*a* of the attachment member 133 that attaches the first flow path plate 131 and second flow path plate 132.

Note that in the example of the above-described embodiment, although the description is given of the configuration in which the flow path plate unit 22 connects the cuff structure 7, which is configured such that the pressing cuff 71 is connected to the sensing cuff 73 and the sensing cuff 73 is connected to the atmosphere, to the pump 14, the embodiment is not limited to this. The flow path plate unit 22 can modify the flow path unit 22*a* as appropriate, by changing the shape of the notch 133*a* of the attachment member 133 in accordance with the structure or the like of the cuff structure 7. In regard to this example, a first modification and a second modification are described.

Figure 6:
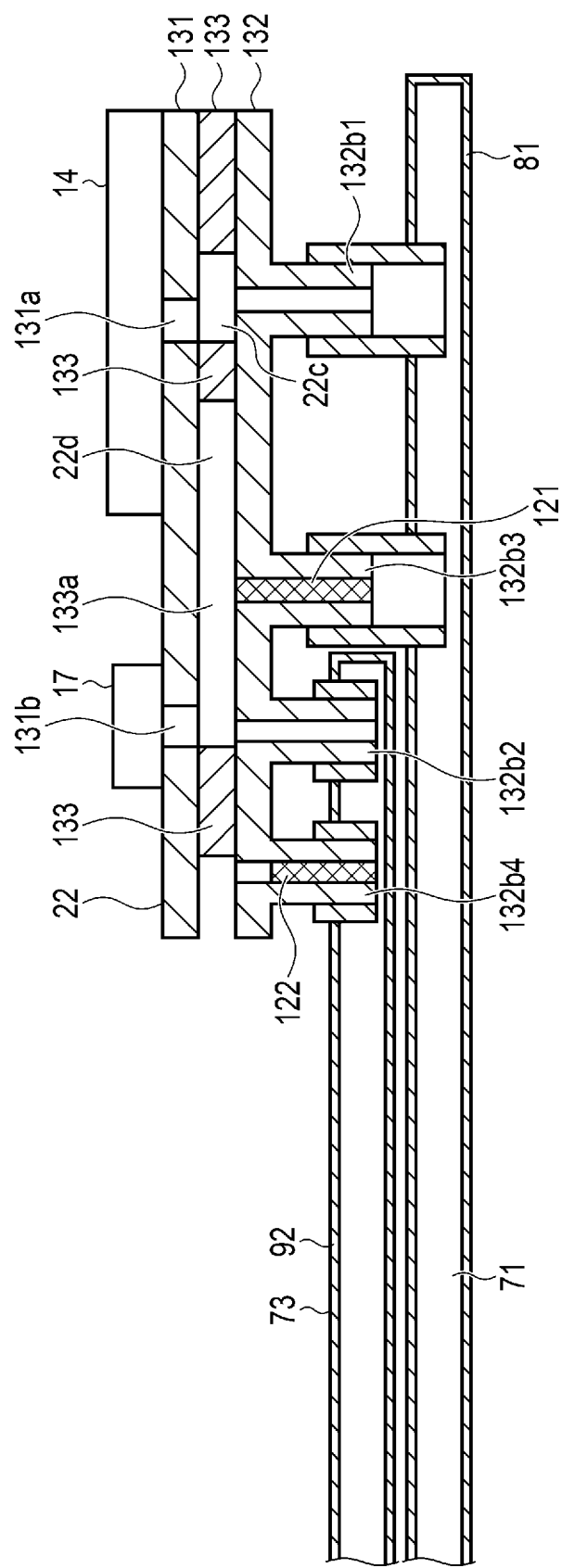
FIG. 6 is a cross-sectional view illustrating a configuration of a pump, a pressure sensor, a flow path plate unit, a pressing cuff and a sensing cuff of the blood pressure measurement device.

The first modification is described with reference to FIG. 5 and FIG. 6. FIG. 5 is a block diagram illustrating a configuration of the first modification of the blood pressure measurement device 1. FIG. 6 is a cross-sectional view illustrating a flow path plate unit 22, a pump 14, a pressing cuff 71 and a sensing cuff 73 of the blood pressure measurement device 1 according to the first modification.

As illustrated in FIG. 5 and FIG. 6, in the first modification, the cuff structure 7 is configured such that the pressing cuff 71 is connected to the sensing cuff 73 via the flow path plate unit 22, and the sensing cuff 73 is connected to the atmosphere via the flow path plate unit 22.

A flow path unit 22*a* of the flow path plate unit 22 includes a first flow path 22*c*, a second flow path 22*d*, a third flow path 22*e*, and a fourth flow path 22*f*.

The third flow path 22*e* is a flow path that fluidly connects the pressing cuff 71 and the sensing cuff 73. In the present modification, by way of example, the third flow path 22*e* is connected to the pressing cuff 71 and the second flow path 22*d*, and connects the pressing cuff 71 and the sensing cuff 73 via the second flow path 22*d*.

The fourth flow path 22*f* is connected to the sensing cuff 73 and the atmosphere.

In a concrete example, on the surface of the second flow path plate 132 on the opposite side to the attachment member 133, a third nozzle 132*b*3 and a fourth nozzle 132*b*4 are further formed as nozzles 132*b* connected to the cuff structure 7.

The third nozzle 132*b*3 constitutes a portion of the third flow path 22*e*. The third nozzle 132*b*3 is connected to the pressing cuff 71. In addition, the first flow rate resistor 121 is provided in the third nozzle 132*b*3.

The fourth nozzle 132*b*4 constitutes a portion of the fourth flow path 22*f*. The fourth nozzle 132*b*4 connects the fourth flow path 22*f* to the sensing cuff 73. The fourth nozzle 132*b*4 is connected to the sensing cuff 73. The fourth nozzle 132*b*4 is connected to, for example, the flow path body 92. The second flow rate resistor 122 is provided in the fourth nozzle 132*b*4.

The notch 133*a* of the attachment member 133 further includes an opening corresponding to the third flow path 22*e* and an opening corresponding to the fourth flow path 22*f*.

Figure 7:
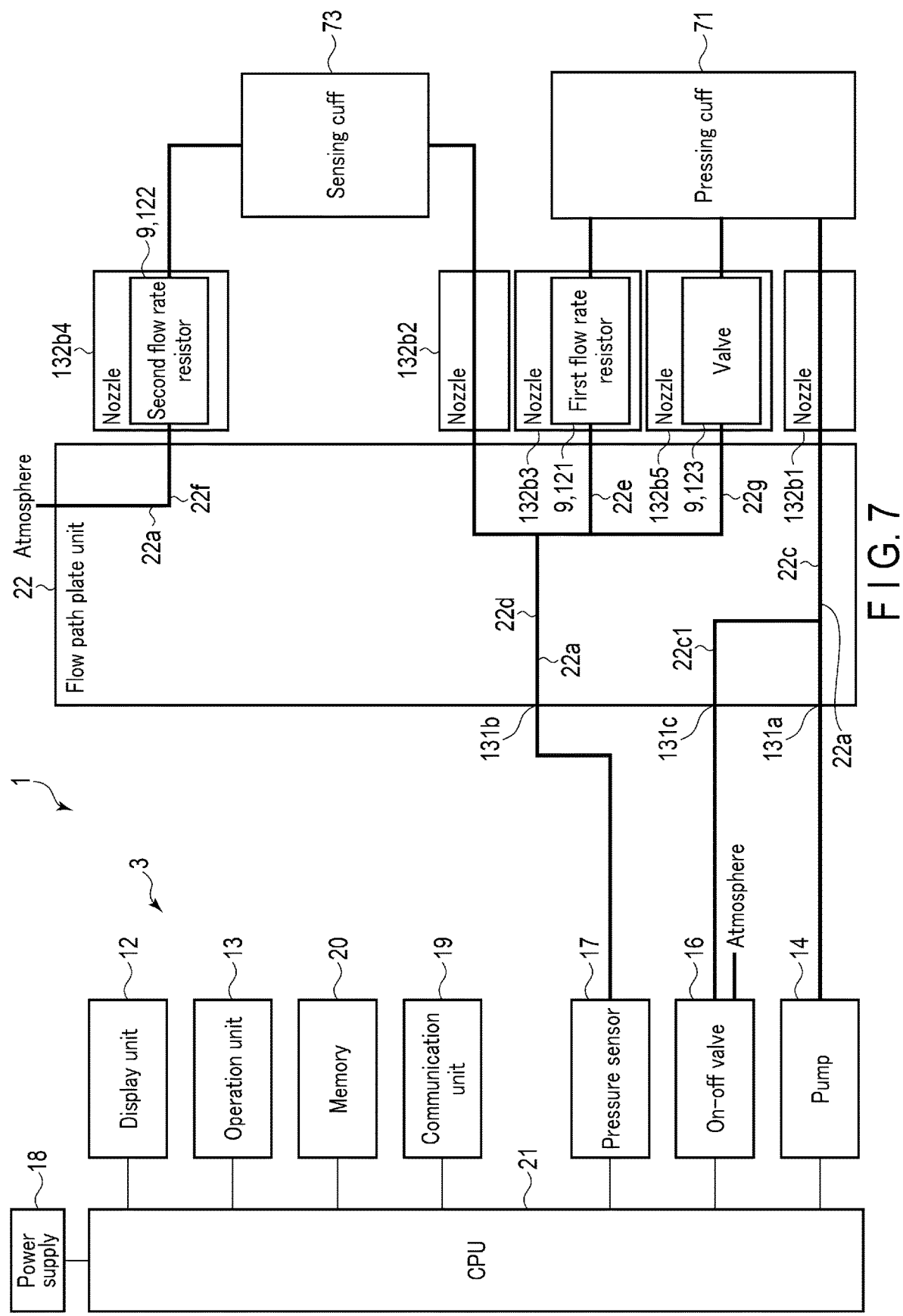
FIG. 7 is a block diagram illustrating a configuration of a second modification of the blood pressure measurement device according to the first embodiment of the present invention.
Figure 8:
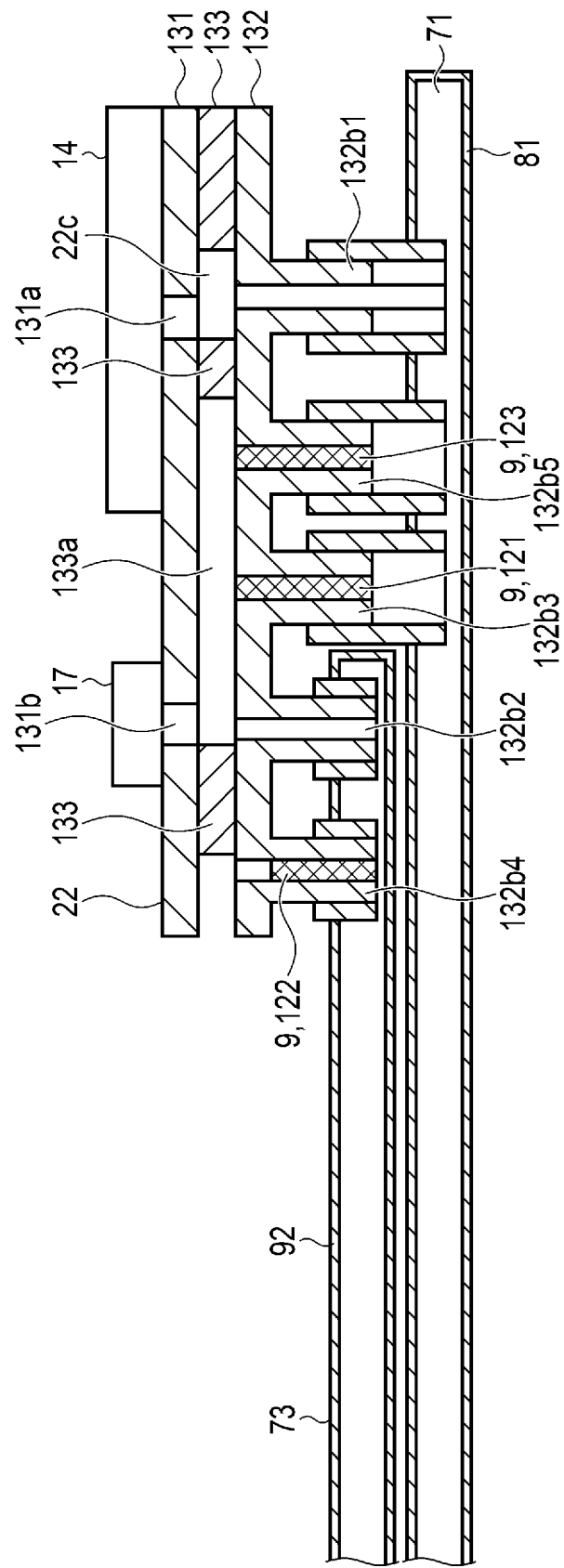
FIG. 8 is a cross-sectional view illustrating a configuration of a pump, a pressure sensor, a flow path plate unit, a pressing cuff and a sensing cuff of the blood pressure measurement device.

Next, the second modification is described with reference to FIG. 7 and FIG. 8. FIG. 7 is a block diagram illustrating a configuration of the second modification of the blood pressure measurement device 1. FIG. 8 is a cross-sectional view illustrating a flow path plate unit 22, a pump 14, a pressure sensor 17, a pressing cuff 71 and a sensing cuff 73 of the blood pressure measurement device 1 according to the second modification.

As illustrated in FIG. 7 and FIG. 8, in addition to the configuration of the first modification, the cuff structure 7 is further configured such that the pressing cuff 71 is connected to the sensing cuff 73 via a valve 123, which is an example of the fluid control unit 9 provided in parallel with the first flow rate resistor 121.

The valve 123 opens in a case where a primary-side pressure is lower than a secondary-side pressure. Specifically, the valve 123 closes when the pressure of the pressing cuff 71 is equal to or higher than the pressure on the sensing cuff 73 side, and opens when the pressure of the pressing cuff 71 becomes lower than the pressure of the sensing cuff 73. This valve 123 is always closed, for example, when air is supplied to the pressing cuff 71 and sensing cuff 73 at a time of blood pressure measurement. In addition, the valve 123 opens when the pressure of the pressing cuff 71 becomes lower than the pressure of the sensing cuff 73. The valve 123 is, for example, a check valve.

For example, a cracking pressure of the valve 123 is set at a pressure that is suitable for exhausting the pressing cuff 71 and sensing cuff 73. In a concrete example, the cracking pressure of the valve 123 is set at 0 mmHg, such that the valve 123 opens when the pressure of the pressing cuff 71 becomes lower than the pressure of the sensing cuff 73.

The flow path unit 22a further includes a fifth flow path 22g. The fifth flow path 22g is a flow path that is provided with the valve 123 and connects the pressing cuff 71 and the sensing cuff 73. In the present modification, the fifth flow path 22g is connected to the pressing cuff 71. In addition, the fifth flow path 22g is connected to the second flow path 22d and the third flow path 22e.

In a concrete example, on the surface of the second flow path plate 132 on the opposite side to the attachment member 133, a fifth nozzle 132b5 is further formed as a nozzle 132b. The fifth nozzle 132b5 constitutes a portion of the fifth flow path 22g. The fifth nozzle 132b5 is connected to the pressing cuff 71. For example, the valve 123 is provided in the fifth nozzle 132b5.

The notch 133a of the attachment member 133 further includes a notch corresponding to the fifth flow path 22g.

Second Embodiment

Next, a blood pressure measurement device 1A according to a second embodiment is described with reference to FIG. 9 and FIG. 10. Note that the blood pressure measurement device 1A according to the second embodiment differs from the blood pressure measurement device 1 of the first embodiment in that the attachment member 133 includes a third flow path plate 135. In the second embodiment, structural elements having the same functions as in the first embodiment are denoted by identical reference signs, and a description thereof is omitted.

Figure 9:
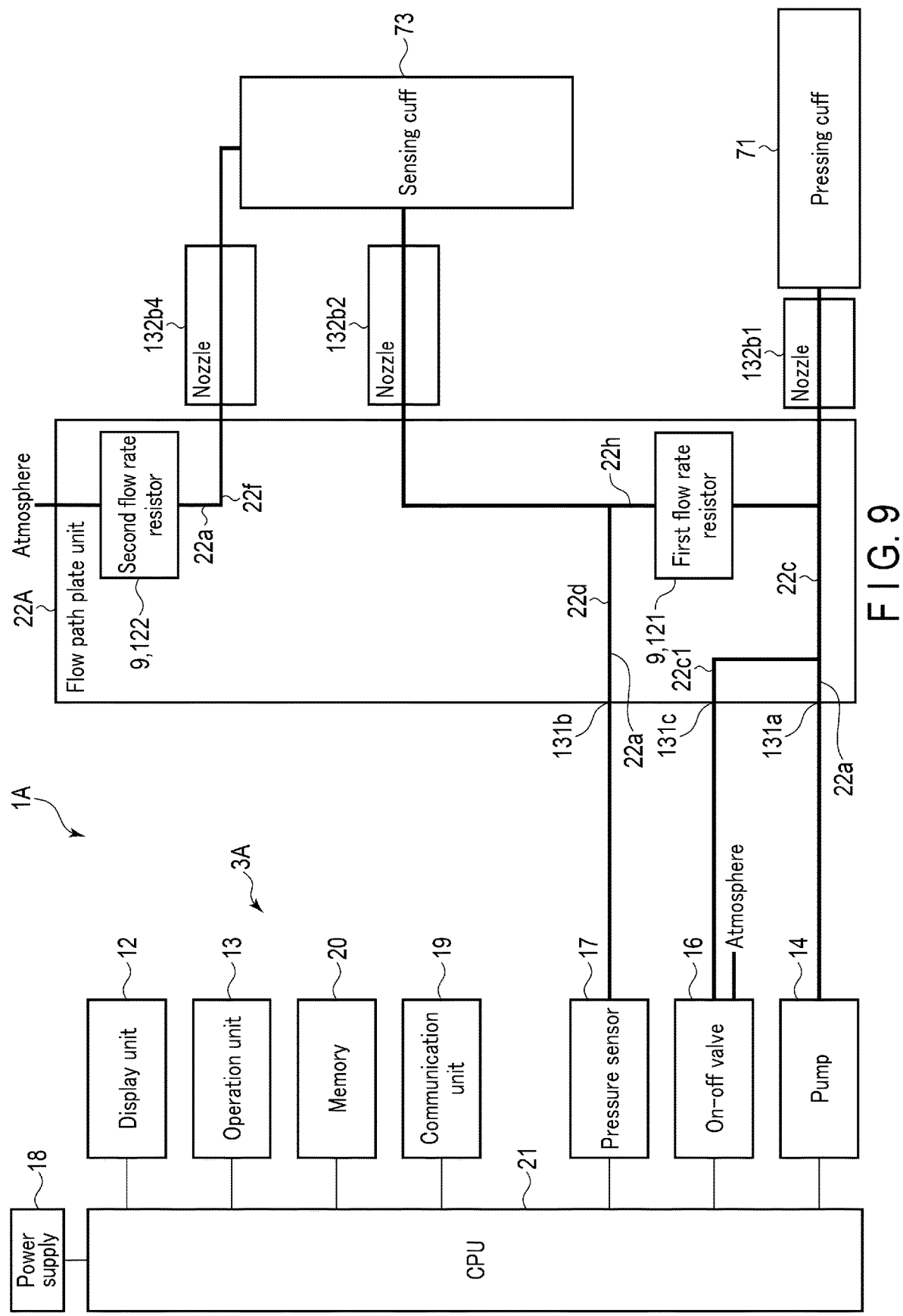
FIG. 9 is a block diagram illustrating a configuration of a blood pressure measurement device according to a second embodiment of the present invention.

FIG. 9 is a block diagram illustrating a configuration of the blood pressure measurement device 1A according to the second embodiment. FIG. 10 is a cross-sectional view illustrating a configuration of a pump 14, a pressure sensor 17, a flow path plate unit 22A, a pressing cuff 71 and a sensing cuff 73 of the blood pressure measurement device 1A.

Figure 10:
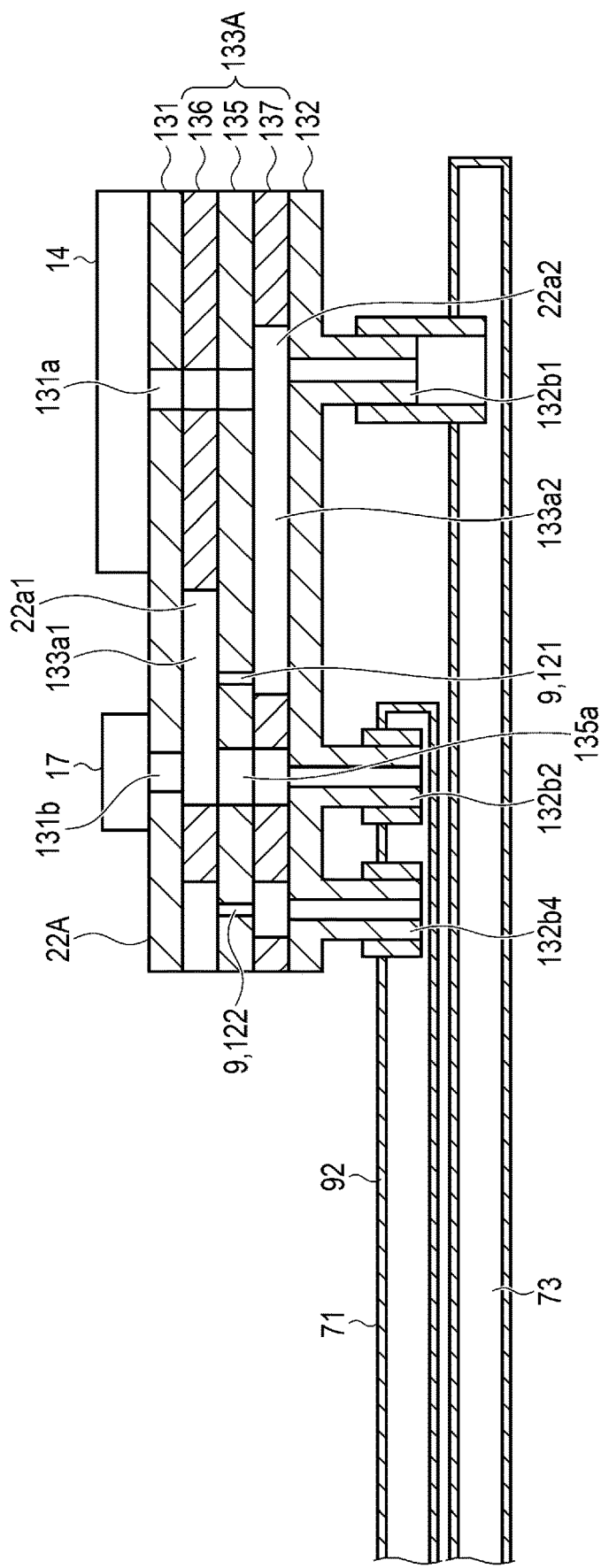
FIG. 10 is a cross-sectional view illustrating a configuration of a pump, a pressure sensor, a flow path plate unit, a pressing cuff and a sensing cuff of the blood pressure measurement device.

As illustrated in FIG. 9 and FIG. 10, the blood pressure measurement device 1A includes, for example, a device body 3A, a belt 4, a curler 5, a cuff structure 7, and a fluid control unit 9. Note that the belt 4, curler 5, cuff structure 7 and fluid control unit 9 are the same as in the first embodiment illustrated in FIG. 1.

The device body 3A includes, for example, a case 11, a display unit 12, an operation unit 13, a pump 14, an on-off valve 16, a pressure sensor 17, a power supply 18, a communication unit 19, a memory 20, a CPU 21, and a flow path plate unit 22A. In regard to the device body 3A, the flow path plate unit 22A is different from the first embodiment, and the case 11, display unit 12, operation unit 13, pump 14, on-off valve 16, pressure sensor 17, power supply 18, communication unit 19, memory 20, and CPU 21 are the same as in the first embodiment, as illustrated in FIG. 1 and FIG. 2.

In the present embodiment, in the cuff structure 7, for example, the fluid control unit 9 is provided in the flow path plate unit 22A. The sensing cuff 73 of the present embodiment is connected to the pump 14 in parallel with the pressing cuff 71 via the flow path plate unit 22A. In addition, the sensing cuff 73 is connected to the atmosphere via the flow path plate unit 22A.

The flow path plate unit 22A includes a first flow path plate 131, a second flow path plate 132, and an attachment member 133A.

In the present embodiment, the second flow path plate 132 includes, for example, a flow path plate body 132a, a first nozzle 132b1, a second nozzle 132b2, and a third nozzle 132b3.

The attachment member 133A attaches the first flow path plate 131 and second flow path plate 132. When attaching the first flow path plate 131 and second flow path plate 132, the attachment member 133A includes a notch 133a that forms the flow path unit 22a together with the first flow path plate 131 and the second flow path plate 132.

The attachment member 133A includes a third flow path plate 135, a first attachment member 136 provided on a surface of the third flow path plate 135, which is opposed to the first flow path plate 131, and a second attachment member 137 provided on a surface of the third flow path plate 135, which is opposed to the second flow path plate 132.

The third flow path plate 135 includes a flow path 135a. The flow path 135a includes the fluid control unit 9 through which air flows in the thickness direction of the third flow path plate 135. The flow path 135a is formed, for example, in shapes of a plurality of holes penetrating in the thickness direction of the third flow path plate 135. As an example of the fluid control unit 9, a part of the holes constitutes one or a plurality of orifices.

In the present embodiment, in the third flow path plate 135, an orifice serving as a first flow rate resistor 121 and an orifice serving as a second flow rate resistor 122 are formed. The third flow path plate 135 is an orifice plate. The first flow rate resistor 121 and second flow rate resistor 122 constitute a portion of the notch 133a.

The first attachment member 136 includes a notch 133a1 that is an opening or notch for forming a flow path 22a1 together with the first flow path plate 131 and third flow path plate 135 when the first attachment member 136 is attached to the first flow path plate 131. The notch 133a1 is a portion of the notch 133a. The first attachment member 136 is composed of, for example, a plurality of double-sided tapes.

The second attachment member 137 includes a notch 133a2 that is an opening or notch for forming a flow path 22a2 together with the second flow path plate 132 and third flow path plate 135 when the second attachment member 137 is attached to the second flow path plate 132. The notch 133a2 is a portion of the notch 133a.

The flow path unit 22a includes a first flow path 22c, a second flow path 22d, a fourth flow path 22f, and a sixth flow path 22h. The sixth flow path 22h is connected to the first flow path 22c and the second flow path 22d. In the example of the present embodiment, for instance, the first flow rate resistor 121 constitutes a portion of the sixth flow path 22h. In addition, in the example of the present embodiment, for instance, the second flow rate resistor 122 constitutes a portion of the fourth flow path 22f.

According to the blood pressure measurement device 1A with the above-described configuration, the flow path plate unit 22A can be reduced in size, since there is no need to form a recess for forming the flow path unit 22a in the first flow path plate 131 and second flow path plate 132. As a result, the blood pressure measurement device 1A can be reduced in size.

Additionally, by integrally attaching the first flow path plate 131 and second flow path plate 132 by the attachment member 133A, the notch 133a formed in the attachment member 133A constitutes the flow path unit 22a. Besides, the attachment member 133A includes the third flow path plate 135 including the flow path. Thus, since a portion of the flow path is formed by the third flow path plate 135, the degree of freedom of the flow path of the flow path plate unit 22A can be enhanced. Moreover, since the third flow path plate 135 is not shaped to include a recess for forming a flow path, the flow path plate unit 22A can be reduced in size. In other words, while the degree of freedom of the flow path can be enhanced, the flow path plate unit 22A can be reduced in size.

Additionally, by forming the flow rate resistors 121 and 122, which are orifices, in the flow path of the third flow path plate 135, the flow path plate unit 22A including orifices therein can be obtained. Moreover, the orifices are formed by a portion of the third flow path plate. Thus, the accuracy in shape of the orifices can be enhanced.

Additionally, by constituting the flow path 135a, which is formed in the third flow path plate 135, by one or a plurality of linear holes penetrating in the thickness direction of the third flow path plate 135, the flow path can be constituted in the third flow path plate 135 even if the thickness of the third flow path plate 135 is reduced. As a result, the flow path plate unit 22A and the blood pressure measurement device 1A can be reduced in size.

Figure 11:
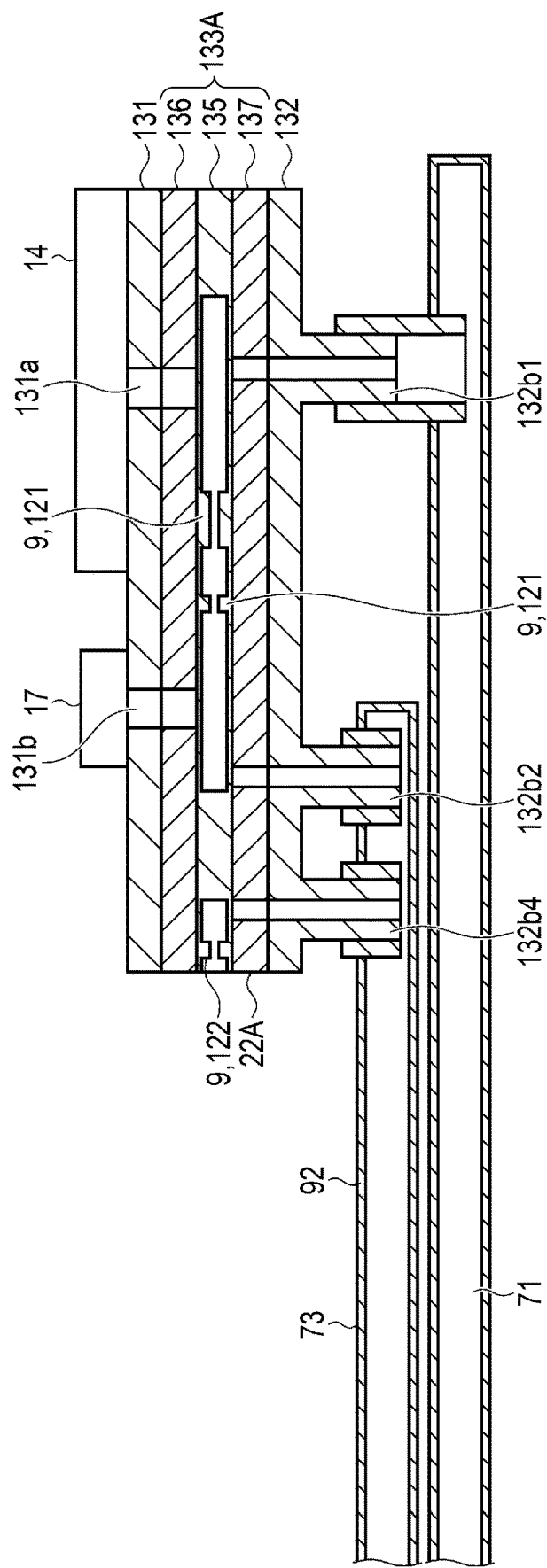
FIG. 11 is a cross-sectional view illustrating a configuration of a pump, a pressure sensor, a flow path plate unit, a pressing cuff and a sensing cuff of a modification of the blood pressure measurement device.

Note that in the above-described second embodiment, by way of example, the third flow path plate 135 is configured to include, as examples of the fluid control unit, the flow rate resistors 121 and 122 that are orifices formed as holes penetrating in the thickness direction of the third flow path plate 135, but the embodiment is not limited to this. In another example, as illustrated in FIG. 11, the flow path 135a of the third flow path plate 135 may be configured to include a fluid control unit through which air passes in a plane direction of the third flow path plate 135. For example, the fluid control unit may be configured to include flow rate resistors 121 and 122.

In this modification, the first attachment member 136 and second attachment member 137 may be configured such that holes are formed therein, which penetrate in the thickness direction and communicate with the flow path 135a in the third flow path plate 135 and the hole formed in the first flow path plate 131, or may be configured to have a shape including an opening forming a flow path extending in the plane direction.

Note that the present invention is not limited to the above-described embodiments. For example, in the example of the blood pressure measurement device of each of the above-described embodiments, the attachment member 133, 136, 137 was described as being configured to use the notch 133a in one double-sided tape by way of example, but the embodiments are not limited to this. In another example, the attachment member 133, 136, 137 may be provided with the notch 133a by combining, for example, a plurality of double-sided tapes. Besides, in another example, the attachment member 133, 136, 137 may be an adhesive or a hot melt.

Additionally, in the above-described example, in the blood pressure measurement device 1 according to the first embodiment, the first flow rate resistor 121 and second flow rate resistor 122, which are configured as separate bodies from the second flow path plate 132, were described by way of example, but the embodiment is not limited to this. In another example, the first flow rate resistor 121 and second flow rate resistor 122 may be formed by narrowing a portion of the flow path of the flow path unit 22a. As an example of this, the first flow rate resistor 121 and second flow rate resistor 122 may be formed by decreasing a flow path cross-sectional area of the nozzle 132b or decreasing a flow path cross-sectional area formed by the notch 133a.

Additionally, in the above-described example, each of the first flow rate resistor 121 and second flow rate resistor 122, which is constituted by one flow rate resistor, was described by way of example, but the embodiment is not limited to this. In another example, as illustrated in FIG. 11, at least one of the first flow rate resistor 121 and the second flow rate resistor 122 may be composed of a plurality of flow rate resistors. In the configuration example illustrated in FIG. 11, two first flow rate resistors 121 are provided.

Additionally, the resistance of the first flow rate resistor 121 and the second flow rate resistor 122 may be adjusted by adjusting the width in the flowing direction of fluid. As one example, FIG. 11 illustrates such a configuration that the width of one first flow rate resistor 121 in the flowing direction of air is set to be longer than the width of the other first flow rate resistor 121 in the flowing direction of air. In addition, the resistance of the first flow rate resistor 121 and the second flow rate resistor 122 may be adjusted by adjusting the flow path cross-sectional area.

Additionally, in the above-described example, a description was given of, by way of example, the configuration in which the flow path plate unit 22, 22A is connected to the cuff structure 7 by the nozzle 132b, but the embodiment is not limited to this. In another configuration example, the second flow path plate 132 may include a hole that constitutes a portion of the flow path unit 22a, and this hole may be connected to the pressing cuff 71 or sensing cuff 73 of the cuff structure 7.

Specifically, in the case of the configuration in which the flow path is formed by the attachment member that attaches the first flow path plate and second flow path plate, the disposition or configuration of the flow path or the flow rate resistor can be set as appropriate.

Additionally, in the first embodiment and the second embodiment, the description was given of, by way of example, the configuration in which the second flow path plate 132 includes the flow path plate body 132a and the nozzle 132b, the flow path plate body 132a is formed of a metallic material, for instance, a metallic plate, and the nozzle 132b is formed of a resin, but the embodiments are not limited to this. In another example, the nozzle 132b may be formed of a metallic material. Note that in regard to the second flow path plate 132, although the flow path plate body 132a is formed of a metallic material, this is one example in which the second flow path plate 132 is formed of a metallic material.

Additionally, in the first embodiment and the second embodiment, the description was given of, by way of example, the configuration in which the first flow path plate 131 and the flow path plate body 132a of the second flow path plate 132 are formed of a metallic material, but the embodiments are not limited to this. At least one of the first flow path plate 131 and the flow path plate body 132a of the second flow path plate 132 may be formed of a metallic material. Alternatively, at least one of the first flow path plate 131 and the second flow path plate 132 may be formed of a metallic material. An example of this includes a configuration in which the first flow path plate 131 is formed of a metallic material. Alternatively, an example of this includes a configuration in which the second flow path plate 132, that is, the flow path plate body 132a and nozzle 132b, is formed of a metallic material.

The present invention is not limited to the above-described embodiments. At the stage of practicing the invention, various modifications may be made without departing from the spirit of the invention. The embodiments may properly be combined and implemented to the extent possible, and in such cases advantageous effects as combined can be obtained. Further, the embodiments include various inventions at various stages, and various inventions may be derived by properly combining structural elements disclosed in the embodiments.

REFERENCE SIGNS LIST

1 . . . Blood pressure measurement device
1A . . . Blood pressure measurement device
3 . . . Device body
4 . . . Belt
5 . . . Curler
7 . . . Cuff structure
9 . . . Fluid control unit
11 . . . Case
12 . . . Display unit
13 . . . Operation unit
14 . . . Pump
16 . . . On-off valve
17 . . . Pressure sensor
18 . . . Power supply
19 . . . Communication unit
20 . . . Memory
21 . . . CPU
22 . . . Flow path plate unit
22A . . . Flow path plate unit
22a . . . Flow path unit
22a1 . . . Flow path
22a2 . . . Flow path
22c . . . First flow path
22c1 . . . Branch flow path
22d . . . Second flow path
22e . . . Third flow path
22f . . . Fourth flow path
22g . . . Fifth flow path
22h . . . Sixth flow path
31 . . . Exterior case
31a . . . Lug
31b . . . Spring bar
32 . . . Windshield
35 . . . Back cover
41 . . . Button
43 . . . Touch panel
61 . . . First belt
62 . . . Second belt
71 . . . Pressing cuff
72 . . . Back plate
73 . . . Sensing cuff
81 . . . Air bag
91 . . . Air bag
121 . . . First flow rate resistor
122 . . . Second flow rate resistor
123 . . . Valve
131 . . . First flow path plate
131a . . . First hole
131b . . . Second hole
131c . . . Third hole
132 . . . Second flow path plate
132a . . . Flow path plate body
132b . . . Nozzle
132b1 . . . First nozzle
132b2 . . . Second nozzle
132b3 . . . Third nozzle
132b4 . . . Fourth nozzle
132b5 . . . Fifth nozzle
133 . . . Attachment member
133A . . . Attachment member
133a . . . Notch
133a1 . . . Notch
133a2 . . . Notch
135 . . . Third flow path plate
136 . . . First attachment member
137 . . . Second attachment member

The invention claimed is:

1. A flow path plate unit connected to a pressing cuff and a sensing cuff that is pressed by the pressing cuff, comprising:
a first flow path plate with at least one surface being formed in a planar shape;
a second flow path plate with one surface, which is opposed to the surface of the planar shape of the first flow path plate, being formed in a planar shape;
a first nozzle provided on the second flow path plate and connected to the pressing cuff;
a second nozzle provided on the second flow path plate and connected to the sensing cuff;
a third nozzle provided on the second flow path plate and connected to the pressing cuff; and
an attachment member including a notch forming a flow path communicating with the first nozzle and a flow path that fluidly connects the third nozzle and the second nozzle, and being configured to attach the first flow path plate and the second flow path plate.

2. The flow path plate unit of claim 1, wherein the attachment member is a double-sided tape.

3. The flow path plate unit of claim 1, wherein at least one of the first flow path plate and the second flow path plate is formed of a metallic material.

4. The flow path plate unit of claim 1, further comprising a fluid control unit provided in the third nozzle.

5. A blood pressure measurement device comprising:
a flow path plate unit including a first flow path plate with at least one surface being formed in a planar shape, a second flow path plate with one surface, which is opposed to the surface of the planar shape of the first flow path plate, being formed in a planar shape, a first nozzle provided on the second flow path plate, a second nozzle provided on the second flow path plate, a third nozzle provided on the second flow path plate, and an attachment member including a notch forming a flow path communicating with the first nozzle and a flow path that fluidly connects the third nozzle and the second nozzle, and being configured to attach the first flow path plate and the second flow path plate;

a pump connected to the flow path plate unit;

a pressure sensor connected to the flow path plate unit;

a pressing cuff connected to the first nozzle and the third nozzle of the flow path plate unit, and fluidly connected to the pump and the pressure sensor via the flow path plate unit; and a sensing cuff connected to the second nozzle of the flow path plate unit, fluidly connected to the pressure sensor via the flow path plate unit, and being pressed by the pressing cuff.

6. The blood pressure measurement device of claim 5, wherein the attachment member is a double-sided tape.

7. The blood pressure measurement device of claim 5, further comprising a fluid control unit provided in the third nozzle.

\* \* \* \* \*